(12) United States Patent
Bardini et al.

(10) Patent No.: US 11,454,955 B2
(45) Date of Patent: Sep. 27, 2022

(54) METHOD AND SYSTEM FOR CONTROLLING A MANUFACTURING PLANT WITH A MANUFACTURING EXECUTION SYSTEM

(71) Applicant: SIEMENS AKTIENGESELLSCHAFT, Munich (DE)

(72) Inventors: Matteo Bardini, Genoa (IT); Fabrizio Camera, Serravalle Scrivia (IT)

(73) Assignee: Siemens Aktiengesellschaft, Munich (DE)

( * ) Notice: Subject to any disclaimer, the term of this patent is extended or adjusted under 35 U.S.C. 154(b) by 1136 days.

(21) Appl. No.: 14/681,307

(22) Filed: Apr. 8, 2015

(65) Prior Publication Data

US 2015/0293529 A1 Oct. 15, 2015

(30) Foreign Application Priority Data

Apr. 9, 2014 (EP) .................................... 14164027
Sep. 23, 2014 (EP) .................................... 14186007

(51) Int. Cl.
*G05B 19/418* (2006.01)

(52) U.S. Cl.
CPC . *G05B 19/41865* (2013.01); *G05B 19/41845* (2013.01); *G05B 2219/31449* (2013.01); *Y02P 80/40* (2015.11); *Y02P 90/02* (2015.11)

(58) Field of Classification Search
CPC ........ G05B 19/41865; G05B 19/41845; G05B 2219/31449; Y02P 90/12; Y02P 90/16; Y02P 90/20; Y02P 90/22; Y02P 90/26

USPC .......................................................... 700/99
See application file for complete search history.

(56) References Cited

U.S. PATENT DOCUMENTS 6,263,255 B1 * 7/2001 Tan .................. G05B 19/41845
                                                                    700/106
7,305,278 B2   12/2007 Enright et al.
8,532,805 B2    9/2013 Mazzarone et al.
(Continued)

FOREIGN PATENT DOCUMENTS

CN  1783129 A   6/2006
CN  102194159 A 9/2011
CN  102479348 A 5/2012

*Primary Examiner* — Michael W Choi
(74) *Attorney, Agent, or Firm* — Laurence A. Greenberg; Werner H. Stemer; Ralph E. Locher

(57) ABSTRACT

A manufacturing plant with an MES system is controlled through the execution of a given workflow. a) A plant designer application models a representation of the manufacturing plant through a set of equipment objects and through a workflow, b) a complex entity (plugin) is provided for expanding the characteristics of an equipment object; the plugin exposing an interface with a configuration, a set of property elements, a set of functionality elements; c) at engineering time, designing a set of plugins usable by the set of equipment objects; d) at engineering time, for at least one equipment object, associating at least one plugin; e) defining, through the plant designer, a given workflow according to given customer requirements, the workflow including an interaction with an element of a plugin associated with an equipment object; f) at runtime, executing the given workflow and performing the interaction with the element of the plugin.

11 Claims, 3 Drawing Sheets

(56) References Cited

U.S. PATENT DOCUMENTS

| | | | |
|---|---|---|---|
| 2004/0199925 A1* | 10/2004 | Nixon | G05B 19/4188 719/315 |
| 2005/0159932 A1* | 7/2005 | Thurner | G05B 19/0426 703/2 |
| 2005/0262236 A1* | 11/2005 | Schachtely | G05B 23/0227 709/224 |
| 2006/0271223 A1 | 11/2006 | Gartland et al. | |
| 2010/0249978 A1* | 9/2010 | Solimano | G06Q 10/04 700/111 |
| 2011/0258598 A1* | 10/2011 | Fernando | G06Q 10/06 717/120 |

* cited by examiner

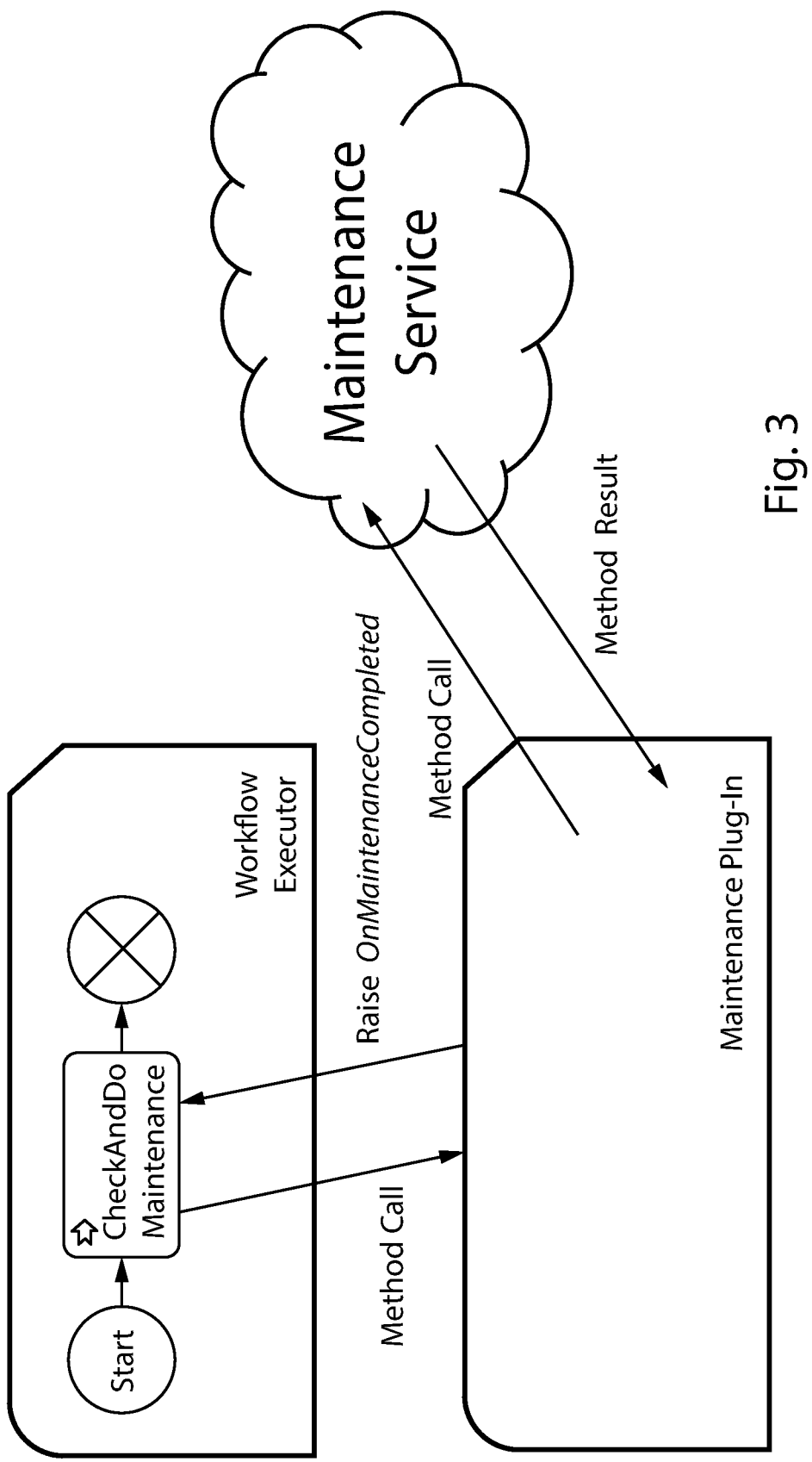

METHOD AND SYSTEM FOR CONTROLLING A MANUFACTURING PLANT WITH A MANUFACTURING EXECUTION SYSTEM

CROSS-REFERENCE TO RELATED APPLICATION

This application claims the priority, under 35 U.S.C. § 119, of European application Nos. EP 14164027.6, filed Apr. 9, 2014, and EP 14186007.2, filed Sep. 23, 2014; the prior applications are herewith incorporated by reference in their entireties.

BACKGROUND OF THE INVENTION

Field of the Invention

The present invention relates to a process and to a system for controlling a manufacturing plant with an MES system, through the execution of a given workflow meeting given customer requirements.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated IT infrastructure that helps them in coordinating production on a global scale and, if necessary, in real time. The Manufacturing Execution System (MES) is generally known as the IT layer that integrates the business systems (e.g. ERP) and production control systems.

The applicant Siemens Corporation (Siemens Aktiengesellschaft of Munich, Germany) offers a broad range of MES products, under its SIMATIC® product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred as ISA-95 or S95.

The functions that an MES system usually includes are resource allocation and status, dispatching production orders, data collection/acquisition, quality management, maintenance management, performance analysis, operations/detail scheduling, document control, labor management, process management and product tracking.

Thus, the goal of MES systems developed by software suppliers is to provide manufacturing companies (the customers) with tools for measuring and controlling production activities with the aim of boosting profitability, increasing productivity, improving quality and process performance to manufacturing plants.

As used herein, a software application is a set of software components developed by software developers to perform some useful actions within an MES system, e.g. monitoring values coming from plant process or controlling a plant device.

Typically, at engineering or configuration time, system engineers or system integrators flexibly customize MES applications according to the specific manufacturing plant requirements.

Instead, at runtime, MES applications are utilized by end-users who may be plant operators or line responsible personnel.

The system engineers, during the configuration phase, are required to define logics intended as a set of operations that are running on the MES platform in order to control manufacturing plant operations. With the term logics, in the MES field, it is typically meant a set of functionalities or operations executed on the MES system.

During configuration, system engineers typically use an application, herein-after called plant designer, to represent the manufacturing plant in a digital manner.

In an MES product, having a plant design phase is useful for classifying the physical equipment that will be used in the production logic of the workflow.

The plant is modeled through an object oriented architecture where equipment objects are the MES entities virtually representing the equipment pieces of the plant. Moreover, the system engineers are required to define through the plant designer the needed plant logics through workflows or rule of production, where a logic is generically defined as an automated procedure for executing a given operation; e.g., logics for maintenance, automation logics (e.g. through PLCs), logics on the product material, logics for order management, logics for line automation and so on.

As used herein, the term workflow means a set of ordered steps for executing a logical operation; where a step may be a logic performing a well-defined task or a call to another workflow.

Thus, in known plant modeling techniques, an equipment object is a collector of data without logics. For example, an equipment object may be represented as a record of a database table where each of the record fields represents an equipment property, e.g. status, weight, dimension, temperature and other equipment characteristics.

In some known prior art techniques, workflow and business rules can be created but they are distinct entities with respect to the plant and equipment management and thus they are, unfortunately, not organized according to the equipment structure.

In some other more advanced prior art techniques, logics can be categorized based on the plant representation, e.g. by adding rules inside equipment objects. This advantageously enables logic characterization but, unfortunately, still has the drawback of not enabling equipment characterization, i.e. characterizing an equipment object with well-known characteristics.

Hence, in all the above-mentioned prior art techniques, there is still no connection between the production logics and the equipment objects beyond the mere aggregation and, unfortunately, another main drawback is also that an equipment object cannot be characterized by runtime capabilities.

Another drawback is that workflows and rules are good for representing simple logics but, unfortunately, they can become quite burdensome—both to execute and to maintain—in complex cases where a great amount of steps and actions are required.

SUMMARY OF THE INVENTION

It is accordingly an object of the invention to provide a process and a system for controlling a manufacturing plant with an MES system which overcomes the above-mentioned and other disadvantages of the heretofore-known devices and methods of this general type and which provides for a process and a system wherein equipment objects are provided with a set of specific characteristics, comprising also functionalities, emulating an Object oriented paradigm.

With the foregoing and other objects in view there is provided, in accordance with the invention, a method and a system for controlling a manufacturing plant with an MES system, through the execution of a given workflow meeting given customer requirements. The invention comprising the following steps:

a) providing an application for modeling a representation of the manufacturing plant through a set of equipment objects and through at least one workflow, said application hereinafter called plant designer; wherein an equipment object is a collector of information;

b) providing a complex entity for expanding the characteristics of an equipment object, such complex entity hereinafter called plugin; the plugin exposing an interface comprising a configuration, a set of property elements, a set of functionality elements;

the method further comprising the following steps to be performed at engineering time:

c) designing a set of plugins usable by the set of equipment objects;

d) for at least one equipment object, associating at least one plugin;

e) through the plant designer, defining a given workflow according to given customer requirements, said given workflow comprising at least one interaction with at least one element of at least one plugin associated to an equipment object;

the method further comprising the following step to be performed at runtime:

f) executing the given workflow and performing the at least one interaction with the at least one element of the at least one plugin of the associated equipment object.

In accordance with an added feature of the invention, an equipment object may preferably be a record of a database table.

In accordance with an additional feature of the invention, a plugin interface may additionally comprise an event element.

In accordance with a further feature of the invention, when a plugin element is a functionality, the interaction is a call to the functionality.

In accordance with again an added feature of the invention, when a plugin element is a property, the interaction is an action of assessing the property.

In accordance with again an additional feature of the invention, when a plugin element is a property, the interaction is an action of firing the event.

With the above and other objects in view there is also provided, in accordance with the invention, a computer program element can be provided, comprising non-transitory computer program code for performing steps according to the above mentioned process when loaded in a digital processor of a computing device.

Additionally, a computer program product stored on a computer usable medium can be provided, comprising computer readable program code for causing a computing device to perform the mentioned process.

With invention embodiments, it is provided a model for managing equipment objects which conveniently unifies the plant design model with the logic definition model.

In accordance with novel embodiments of the invention, equipment entities may be advantageously enriched with logics functionalities which can be called from a workflow.

With invention embodiments, equipment objects can be designed with a set of specific capabilities, emulating an Object Oriented Programming (OOP) paradigm, where each equipment object has a well-defined set of functionalities. In fact, the plant design enables to enrich the equipment objects by adding plug-in based entities for performing actions on workflow scenarios. Hence, with the plugin executable logic, an equipment object can be seen as a complex object that can be adapted in order to meet a great number of requirements of manufacturing scenario and that can be used in the same way as a real OOP object.

With invention embodiments, a set of equipment objects may advantageously be characterized by a given category of exposed functionalities and/or properties, e.g. a set of equipment objects for moving a given material, a set of equipment objects which require maintenance etc.

In accordance with preferred features of the invention, the runtime logic and the plant model description defined at engineering time are associated in the same equipment object entities and have the same lifecycle and/or version. For example, a system integrator may first define an equipment object and then a logic through a plugin. Once the plugin is associated to the equipment object, in software upgrades they are dealt together.

In addition, the system engineer can develop a standalone module comprising a set of plugins for a specific customer project and she/he can conveniently reuse it in other projects without particular concern about integration and distribution issues. A plugin can be defined independently from a specific equipment object and can be used by several of them.

Embodiments of the invention provide advantages in terms of the development process and in terms of work breakdown. In fact, thanks to its flexible level of granularity, from a work organization point of view the plug-in development can be adapted to the project needs.

In accordance with a further feature of the invention, plugins may be provided within a coded library which may advantageously be developed in a performing programming language, improving performance and reducing the logic complexity. Hence, software developers and system engineers are enabled to design the plugin functionalities in a programming language, e.g. C#, C++ or JavaScript, in addition to the option of using a high-level design language such as workflows or business rules, which become burdensome when logics are complex and require a great amount of steps and actions.

Other features which are considered as characteristic for the invention are set forth in the appended claims.

Although the invention is illustrated and described herein as embodied in controlling a manufacturing plant with an MES system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a block diagram schematically illustrating, in an example embodiment of the present invention, the execution of a plugin method and the subsequent raise of a plugin event.

DETAILED DESCRIPTION OF THE INVENTION

Figure 1:
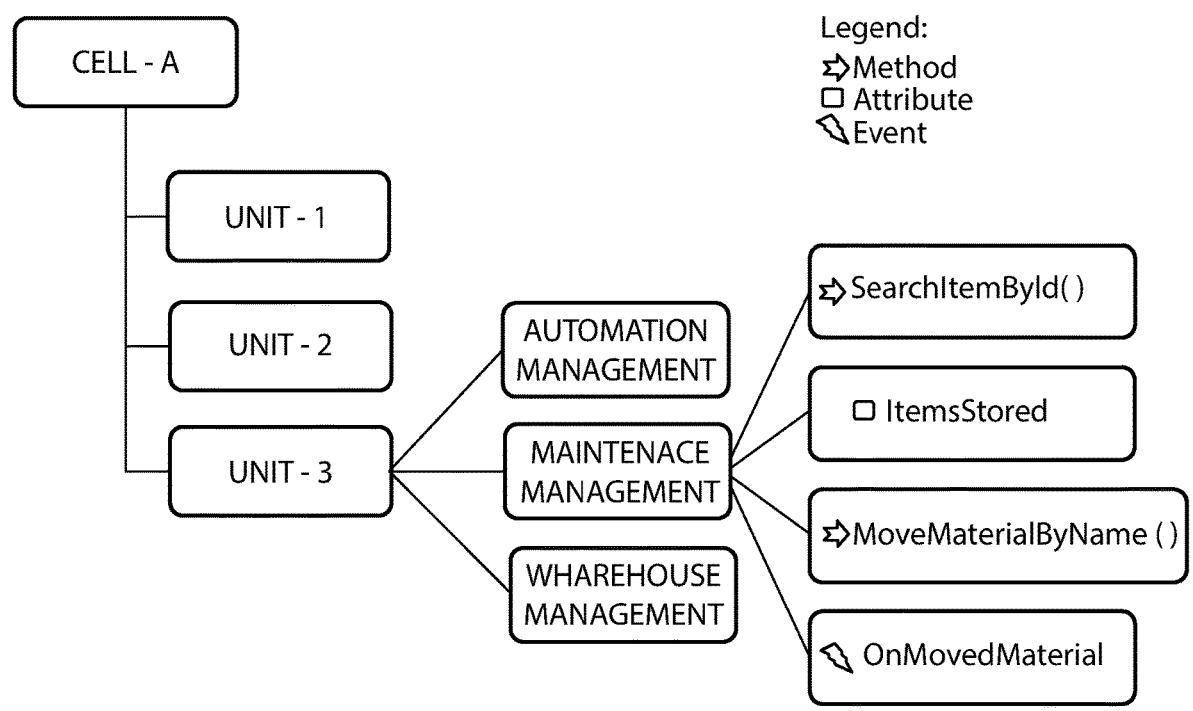
FIG. 1 is a block diagram schematically illustrating, in an exemplary embodiment of the present invention, how plugins may be placed inside a fragment of a plant model.

At least some embodiments of the present invention address the above described issue in which a manufacturing plant is controlled with an MES system, through the execution of a given workflow meeting given customer requirements.

An application, called plant designer, is provided for modeling a representation of the manufacturing plant through a set of equipment objects and through at least one workflow.

An equipment object is a collector of information, preferably it may be in form of a record of a table of a database, where each field may conveniently define a given equipment property.

A complex entity, called plugin, is provided for expanding the characteristics of an equipment object. The plugin exposes an interface comprising a configuration, a set of property elements, a set of functionality elements and, optionally, a set of events.

In particular:

The configuration enables the system engineer to define the plug-in behavior, e.g. which functionalities, properties and/or events are exposed in the plugin;

the properties are the parameters to be used for runtime I/O operations;

the functionalities represent the plugin capabilities, also called methods;

the events may be used for detecting changes happening outside the plant environment or for notifying changes inside the plant.

At engineering time, it is designed a set of plugin usable by the equipment objects.

At engineering time, for at least one equipment object is associated at least one plugin.

At engineering time, through the plant designer, it is defined a given workflow according to given customer requirements. The given workflow comprises at least one interaction with at least one element of at least one plugin associated to an equipment object.

At runtime, the given workflow is executed and it is performed the at least interaction with the at least one element of the at least one plugin of the associated equipment object.

The action of interacting or interaction with the at least one plugin element may be one of the following, according to the involved type of element of the plugin:

when the plugin element is a functionality, the interaction is the action of calling the functionality;

when the plugin element is a property, the interaction is the action of assessing the property;

when the plugin element is an event, the interaction is the action of firing the event;

In invention embodiments, the set of plugins may preferably be developed using a common programming language and/or they may conveniently be packaged as a library, e.g. in the Windows environment as Dynamic Library or Static Library. In this manner, it is enabled the optimization of the logic execution and the developers and system engineers are provided with a user friendly language.

In invention embodiments, the plugin base structure may preferably be designed so as to be self-describing, meaning that the configuration, the properties, the functionalities and, optionally, the events may conveniently be not real elements but mere descriptors. Advantageously, having such structure, compared to a hard-coded one, is characterized by a higher degree of flexibility, both from the developer side and the final integrator/system engineer side. By having a descriptor structure and not an hard-coded one, a plug-in can conveniently be developed in order to evolve and change depending on the user request. For instance, adding a new property to the equipment object becomes a simple task, e.g. adding a property descriptor inside the list of properties exposed by the plugin.

The equipment object is not an object class, it does not have functionalities. Its functionalities are called thorough the plugin associated to the equipment object.

A plugin has advantageously a status, the state of all its property, and may optionally have a memory. Hence it is an entity that can change status and, in case a memory is present, it may remember such status changes, e.g. in a plugin for material movement, it can be tracked where the material was moved from.

In addition, in embodiments of the present invention, a real time representation of the plant may advantageously be achieved without needing to access the database, e.g. a representation of the bindings among PLCs (Programmable Logic Controllers). For example, the status of each equipment, the state of all its properties, may be updated using a plugin, called Automation plugin, which links it with the information exposed by an HMI (Human Machine Interface) working directly on the PLC Layer. In such example, it is not required to have a place for storing data for retrieving it, since all the information are stored in the RAM and are accessed combining the equipment and the Automation plugin.

FIG. 1 is a block diagram schematically illustrating, in an example embodiment of the present invention, how plugins may be placed inside a fragment of a plant model.

Block CELL-A represents an equipment object at "Cell" level, following ISA95 naming convention. The units UNIT-1, UNIT-2 and UNIT-3 represent equipment objects.

To equipment object UNIT-3 are associated three plugins, one for "AUTOMATION MANAGEMENT," one for "MAINTENANCE MANAGEMENT" and one for "WHAREHOUSE MANAGEMENT." The "MAINTENANCE MANAGEMENT" plugin exposes an interface with following four elements: two methods or functionalities called "SearchitemById( )" and "MoveMaterialByName," one property or attribute called "ItemsStored" and one event called "OnMovedMaterial".

Figure 2:
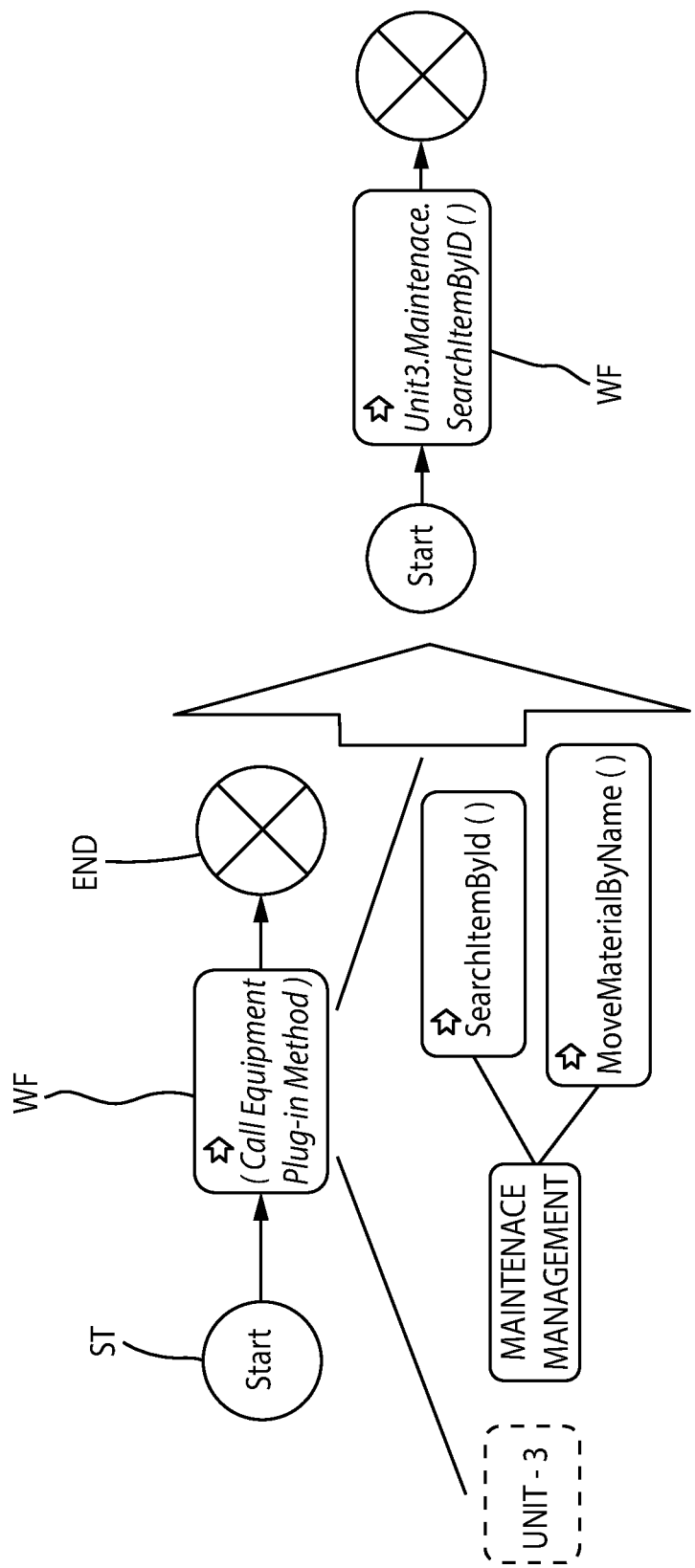
FIG. 2 is a block diagram schematically illustrating, in an example embodiment of the present invention, how the functionality inside a plug-in can be executed from a workflow.

FIG. 2 is a block diagram schematically illustrating in an example embodiment of the present invention how the functionality inside a plug-in can be executed from a workflow.

Between the start ST and the end END of the workflow WF of FIG. 2, there is an interaction with an element of a plugin, in form of call to a plugin method.

First the system engineer chooses the equipment object UNIT-3, then she/he selects the MAINTENANCE MANAGEMENT plugin and finally she/he selects the method SearchItemByID( ) DO to be executed.

FIG. 3 is a block diagram schematically illustrating, in an example embodiment of the present invention, the execution of a plugin method and the subsequent raise of a plugin event.

In a simple example embodiment, an equipment object representing a mixer piece may preferably be associated with an "Automation Field Management" plugin for enabling the communication with the relevant PLC. In addition, let us assume that such mixer equipment piece needs also to be maintained. Thus, to the mixer equipment object is also associated a "Maintenance Management" plugin so as to enable the access to all the functionalities used in a typical maintenance situation. This equipment object, with all the plugins associated and configured, may then conveniently be used in the definition of higher-level logics, such as rules or workflows.

Such configured equipment object exposes for example the method "CheckAndDoMaintenance", which is called by a workflow each time the maintenance period is due, as follows:
- the engine executing the workflow, called Workflow Executer, starts the workflow until it encounters the interaction with the plugin element, the call the method or functionality "CheckAndDoMaintenance" of the "Maintenance" plugin, e.g. in a .NET environment via reflection.
- the "Maintenance" plugin connects to a maintenance service performing the required operation;
- at the operation completion, the maintenance service communicates the result to the maintenance plugin, which raises an event "OnMaintenanceCompleted"
- the workflow executor catches the event and, if the maintenance is successful, the workflow arrives to the end END.

Since the maintenance plugin has a status, it can also be configured for example as status "Ready", or as a property "To_be-maintained in 5 days". Advantageously, by using a plugin, a maintenance property needs not to be defined in the equipment objects since some objects may not require any maintenance. Instead, with embodiments of the invention, a plugin for maintenance may be conveniently associated to a given set of equipment objects.

In addition, with a maintenance plugin, all the properties and functionalities linked to maintenance are grouped in a compact manner.

The invention claimed is:

1. A process for controlling a manufacturing plant with an MES (manufacturing execution system) system, through an execution of a given workflow meeting given customer requirements, the process comprising:
   providing an application for modeling a representation of the manufacturing plant through a set of equipment objects and through at least one workflow, the application being a plant designer and an equipment object of the set of the equipment objects being a collector of information, wherein the set of the equipment objects are not object classes;
   expanding, with a complex entity, characteristics of the equipment object of the set of equipment objects, the complex entity being a plugin and the plugin exposing an interface including a configuration, a set of property elements, and a set of functionality elements, wherein the expanding of the characteristics of the equipment object includes at least adding a new property to the equipment object;
   performing the following steps at engineering time:
   designing a set of plugins usable by the set of equipment objects;
   for at least one equipment object of the set of the equipment objects, associating at least one plugin of the set of the plugins;
   through the plant designer, defining the given workflow accordingly to the given customer requirements, the given workflow including at least one interaction with at least one element of the at least one plugin associated with the at least one equipment object; and
   performing the following step at runtime:
   executing the given workflow and performing the at least one interaction with the at least one element of the at least one plugin associated with the at least one equipment object.

2. The process according to claim 1, wherein the at least one equipment object is a record of a database table.

3. The process according to claim 1, wherein the interface comprises an event element.

4. The process according to claim 1, wherein, when the at least one element of the at least one plugin is a functionality, the at least one interaction is a call to a functionality of the set of the functionality elements.

5. The process according of claim 1, wherein, when the at least one element of the at least one plugin is a property, the at least one interaction is an action of assessing the property.

6. The process according of claim 1, wherein, when the at least one element of the at least one plugin is a property, the at least one interaction is an action of raising the event.

7. The process according of claim 1, wherein an operation in the given workflow is a maintenance operation.

8. The process according to claim 1, wherein the at least one plug-in raises an event that indicates a completion of an operation in the given workflow.

9. A system for controlling a manufacturing plant with an MES system, through an execution of a given workflow meeting given customer requirements, the system comprising:
   an application for modeling a representation of the manufacturing plant through a set of equipment objects and through at least one workflow, said application being a plant designer, wherein the set of the equipment objects are not object classes;
   an equipment object of the set of the equipment objects being a collector of information;
   a complex entity for expanding a characteristic of the equipment object of the set of the equipment objects, wherein the expanding of the characteristic of the equipment object includes at least adding a new property to the equipment object, the complex entity being a plugin;
   the plugin exposing an interface including a configuration, a set of property elements, and a set of functionality elements;
   the system further comprising the following means to be used at engineering time:
   means for designing a set of plugins usable by the set of equipment objects;
   for at least one equipment object of the set of the equipment objects, means for associating at least one plugin of the set of plugins;
   through the plant designer, means for defining the given workflow according to the given customer requirements, the given workflow including at least one interaction with at least one element of the at least one plugin of the set of plugins, wherein the at least one plugin is associated with the at least one equipment object; and the system further comprising the following means to be used at runtime:

means for executing the given workflow and performing the at least one interaction with the at least one element of the at least one plugin associated with the at least one equipment object.

10. The system according of claim 9, wherein an operation in the given workflow is a maintenance operation.

11. The system according of claim 9, wherein the at least one plug-in raises an event that indicates a completion of an operation in the given workflow.

* * * * *